United States Patent
Yachi et al.

(10) Patent No.: US 6,177,756 B1
(45) Date of Patent: Jan. 23, 2001

(54) PIEZOELECTRIC GYRO AND METHOD OF DRIVING THE PIEZOELECTRIC GYRO

(75) Inventors: Masanori Yachi, Kawasaki; Noboru Wakatsuki, Ishinomaki; Sumio Yamada, Kawasaki, all of (JP)

(73) Assignee: Fujitsu Limited, Kawasaki (JP)

( * ) Notice: Under 35 U.S.C. 154(b), the term of this patent shall be extended for 0 days.

(21) Appl. No.: 09/223,282

(22) Filed: Dec. 30, 1998

(30) Foreign Application Priority Data

Jun. 18, 1998 (JP) .................................................. 10-171814

(51) Int. Cl.[7] .............................. H01L 41/08; G01P 15/09
(52) U.S. Cl. ........................ 310/370; 310/316.02; 73/505
(58) Field of Search .................................. 310/321, 366, 310/367, 370; 73/505, 517 R, 517 A, 517 AV, 1 D

(56) References Cited

U.S. PATENT DOCUMENTS

| | | | |
|---|---|---|---|
| 5,396,144 | * 3/1995 | Gupta et al. | 310/370 |
| 5,420,548 | * 5/1995 | Nakajima | 310/370 X |
| 5,426,970 | * 6/1995 | Florida et al. | 310/370 X |
| 5,757,107 | * 5/1998 | Wakatuki et al. | 310/370 |
| 5,824,900 | * 10/1998 | Konno et al. | 310/370 X |
| 5,861,705 | * 1/1999 | Wakatsuki et al. | 310/365 X |
| 5,912,528 | * 6/1999 | Kumada | 310/316.02 X |

FOREIGN PATENT DOCUMENTS

| | | |
|---|---|---|
| 1-143961 | 6/1989 | (JP) . |
| 10-38579 | 2/1998 | (JP) . |

* cited by examiner

Primary Examiner—Mark O. Budd
(74) Attorney, Agent, or Firm—Armstrong, Westerman, Hattori, McLeland & Naughton

(57) ABSTRACT

In a piezoelectric gyro, an amplifier 42 receives and amplifies a detected signal from detecting electrodes 19 through 26, and a bandpass filter 43 extracts only a detection-side resonant frequency component from the amplified signal. The extracted resonant frequency component is phase-shifted by a phase-shifting circuit 44, and the resultant signal is passed through a limiting resistor 45 to prepare a constant-current drive signal, and the drive signal is inputted to drive electrodes 11 through 18. As a result, the piezoelectric gyro oscillates self-excitedly at the detection-side resonant frequency. The present invention provides a piezoelectric gyro capable of maintaining a high sensitivity with respect to a change in temperature by improving detection sensitivity.

23 Claims, 14 Drawing Sheets

PIEZOELECTRIC GYRO AND METHOD OF DRIVING THE PIEZOELECTRIC GYRO

BACKGROUND OF THE INVENTION

A. Field of the Invention

The present invention relates to a piezoelectric gyro that vibrates in a direction of detected vibration orthogonal to a direction of driven vibration in accordance with an angular velocity added when the gyro is excited in the direction of driven vibration, and to a method of driving such a piezoelectric gyro.

B. Description of the Related Art

Motion of a substance may be mathematically divided into translational motion and rotational motion. A piezoelectric gyro that can detect only rotational motion independently of translational motion is known. Such a piezoelectric gyro is constructed to serve as, for instance, a tuning-fork piezoelectric element having two arms extending in parallel with each other from a base. Further, drive electrodes are attached to one of the arms and detecting electrodes to the other arm. The drive electrodes are positioned so that the arm vibrates within a plane when a drive signal is supplied to the drive electrodes. If an angular velocity derived from rotational motion is added when the arm is in a driven vibration mode after the drive signal has been supplied to the drive electrodes, a Coriolis force acts to cause the arm to vibrate in a direction orthogonal to a direction of driven vibration, i.e., perpendicularly to the plane. If the detecting electrodes are arranged so that such vibration perpendicular to the plane can be detected, the added angular velocity can be detected based on an output signal from these detecting electrodes. Such a piezoelectric gyro comes in the following types as typical ones: a column type that has a circular, triangle, or rectangular cross-section; a tuning fork type that has three or more arms; and an H type that has arms extending from opposite ends of a base. These piezoelectric gyros are widely used, e.g., for detecting unintentional movement of the hands in taking a picture with a video camera, detecting a yaw rate in driving an automobile, and detecting the position of a mobile body in a navigation system or the like.

In such a piezoelectric gyro, by making a resonant frequency in a driven vibration mode closer to a resonant frequency in a detected vibration mode, detection sensitivity can be improved. However, it is difficult to make the resonant frequency in the driven vibration mode exactly equal to the resonant frequency in the detected vibration mode due to errors derived from the coupling of the respective vibration modes and the like. It has heretofore been common to drive the gyro at the resonant frequency in the driven vibration mode which is out of phase with the resonant frequency in the detected vibration mode. Further, to stabilize the excited state at such resonant frequency in the driven vibration mode, it is feasible to set the gyro into self-excited oscillation utilizing driven resonance.

In the aforementioned gyro, when the gyro is driven at the resonant frequency in the driven vibration mode, there is always a strong possibility that adequate detection sensitivity will not be obtained. Further, in some piezoelectric vibrators, the resonant frequency in each vibration mode changes with changing temperature, and this requires that a detected signal be subjected to temperature correction. For example, when a tuning fork-type or H-type piezoelectric vibrator is constructed using a tantalic acid lithium single crystal ($LiTaO_3$), a resonant frequency for vibration within a plane (fx mode) exhibits satisfactory stability with respect to temperature, while a resonant frequency for vibration perpendicular to the plane (fz mode) is changed greatly by temperature. When the gyro is excited at an fx-mode resonant frequency using such a vibrator made of a tantalic acid lithium single crystal while specifying the fx mode as the driven vibration mode and the fz mode as the detected vibration mode, the detection sensitivity changes greatly with changing environment, and this requires that temperature correction be made.

SUMMARY OF THE INVENTION

One object of the present invention is to provide a piezoelectric gyro that is capable of maintaining a high sensitivity with respect to a temperature change and a method of driving such a piezoelectric gyro.

In one aspect of the present invention, a piezoelectric gyro is configured such that a direction of driven vibration is orthogonal to a direction of detected vibration, and which generates an excitation in the direction of driven vibration at a resonant frequency in the direction of detected vibration.

In the above aspect of the present invention, even if the resonant frequency in the direction of detected vibration undergoes a change with changing temperature, the driven vibration can follow up with a corresponding change in the resonant frequency, and thus a high detection sensitivity can be maintained.

The piezoelectric gyro may be configured to include a self-excited oscillation circuit for generating the excitation in the direction of driven vibration by detecting a leakage output in the direction of detected vibration.

Therefore, a driven vibration is generated by an excitation derived from the leakage output from the driven vibration to the detected vibration. Therefore, the gyro can be driven at the resonant frequency in the direction of detected vibration, and thus the detection sensitivity can be improved.

The piezoelectric gyro may include a base and two arms extending in parallel with each other from the base, and has an arrangement in which one of the arms may have drive electrodes to which a drive signal is supplied and the other arm may have detecting electrodes for outputting a detected signal.

In this case, the aforementioned configuration can be applied to a so-called tuning fork-type piezoelectric gyro.

Further, the drive electrodes may be arranged so that the arm vibrates within a plane when the drive signal is supplied to the drive electrodes, and the detecting electrodes may be arranged so as to output the detected signal when the arm vibrates perpendicularly to the plane.

Still further, the drive electrodes may be arranged so that the arm vibrates perpendicularly to a plane when the drive signal is supplied to the drive electrodes, and the detecting electrodes may be arranged so as to output the detected signal when the arm vibrates within the plane.

In this case, any of the vibrations of the arm within the plane and the vibration of the arm perpendicular to the plane may be used as the detected vibration. When the vibration within the plane having a high Q factor is used for the detection side, a higher detection sensitivity can be obtained.

The piezoelectric gyro may include a base, two drive arms extending in parallel with each other from the base, and two detecting arms extending in parallel with each other from the base on a side opposite to the drive arms, and the drive arms may have drive electrodes to which a drive signal is supplied, and the detecting arms may have detecting electrodes for outputting a detected signal.

In this case, the aforementioned configuration can be applied to a so-called H-type piezoelectric vibrator.

In such a configuration, the drive electrodes may be arranged so that the drive arms vibrate within a plane when the drive signal is supplied to the drive electrodes, and the detecting electrodes may be arranged so as to output the detected signal when the detecting arms vibrate perpendicular to the plane.

Further, the drive electrodes may be arranged so that the drive arms vibrate perpendicular to a plane when the drive signal is supplied to the drive electrodes, and the detecting electrodes may be arranged so as to output the detected signal when the detecting arms vibrate within the plane.

In this case also, similarly to the aforementioned tuning fork-type gyro, any of the vibration within the plane and the vibration perpendicular to the plane can be used as the detected vibration. When the vibration within the plane having a high Q factor is used for the detection side, a higher detection sensitivity can be obtained.

Still further, the leakage output in the direction of detected vibration may be detected based on the detected signal outputted from the detecting electrodes. When leakage output detecting electrodes are additionally provided, the leakage output in the direction of detected vibration may also be detected based on a detected signal outputted from these leakage output detecting electrodes.

Further, the drive signal supplied to the drive electrodes may be an ac constant current. In this case, even if an internal mechanical impedance is changed due to the addition of an angular velocity to this piezoelectric gyro, the oscillation frequency does not change, and thus the gyro can be excited stably.

Further, the drive signal supplied to the drive electrodes may be amplitude-modulated or frequency-modulated using the resonant frequency in the direction of detected vibration as a carrier.

Still further, the present invention proposes a piezoelectric gyro having a piezoelectric vibrator, drive electrodes, detecting electrodes, a constant-current circuit and a self-excited oscillation circuit. The piezoelectric vibrator has a base, two drive arms extending in parallel with each other from one end of the base, and two detecting arms extending in parallel with each other from the other end of the base, and the base, the two drive arms and the two detecting arms are formed integrally with one another. The drive electrodes are arranged on external surfaces of the drive arms so that the drive arms vibrate in a direction perpendicular to a plane when a drive signal is supplied to the drive electrodes. The detecting electrodes are arranged on external surfaces of the detecting arms so as to output a detected signal when the detecting arms vibrate within the plane. The constant-current circuit supplies to the drive electrodes the drive signal for driving the drive arms to vibrate. The self-excited oscillation circuit detects a leakage output in a detected vibration based on the detected signal from the detecting electrodes and oscillates the drive signal to be supplied to the drive electrodes from the constant-current circuit at a frequency of the leakage output.

In this case, a self-excitation is generated by feeding the detected signal obtained from the detecting electrodes provided on the detecting arms back to the drive electrodes provided on the drive arms. That is, the gyro is driven at the resonant frequency of the detecting arms. Therefore, even if the resonant frequency on the detection side changes, a high detection sensitivity can be maintained.

Still further, the present invention proposes a method of driving a piezoelectric gyro that vibrates in a direction of detected vibration orthogonal to a direction of driven vibration in accordance with an angular velocity added when the gyro is excited in the direction of driven vibration, and the method involves a step of generating an excitation in the direction of driven vibration at a resonant frequency in the direction of detected vibration.

Here, the excitation in the direction of driven vibration may be generated by detecting a leakage output in the direction of detected vibration and using the detected leakage output.

Further, the leakage output may be detected based on an output signal of the detecting electrodes for obtaining a detected vibration. A leakage output can also be detected based on an output signal from leakage output detecting electrodes for detecting the leakage output.

Still further, the drive signal may be prepared by a constant-current circuit.

Furthermore, a driven vibration may be generated by the drive signal that is amplitude-modulated or frequency-modulated using the resonant frequency in the direction of detected vibration as a carrier.

DETAILED DESCRIPTION OF THE PREFERRED EMBODIMENTS

A first embodiment of the present invention is described below with respect to FIGS. 1 through 10.

Figure 1:
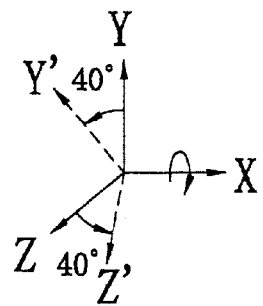
FIG. 1 is a diagram representing the crystal orientation of a tantalic acid lithium single crystal of a piezoelectric vibrator in accordance with a first embodiment of the present invention.
Figure 2:
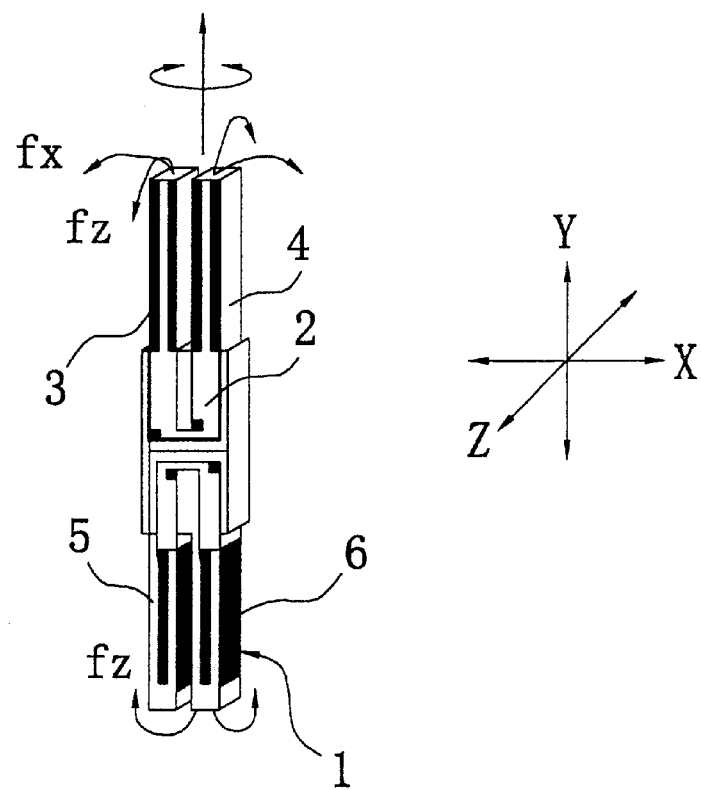
FIG. 2 is a perspective view of an H-type piezoelectric vibrator in accordance with the first embodiment of the present invention.

An H-type piezoelectric vibrator 1 is prepared such as shown in FIG. 2 using a 130°-rotated y-tantalic acid lithium single crystal having a crystal orientation as shown in FIG. 1.

The piezoelectric vibrator 1 has a first drive arm 3 and a second drive arm 4 extending in parallel with each other from one end of a base 2, and a first detecting arm 5 and a second detecting arm 6 extending from an opposite end of the base 2.

Figure 3:
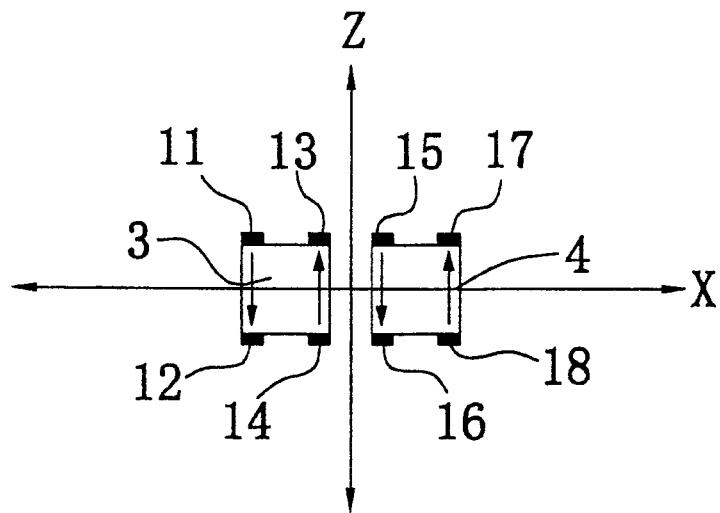
FIG. 3,is a top view of the H-type piezoelectric depicted FIG. 2, showing an arrangement of electrodes thereon.
Figure 4:
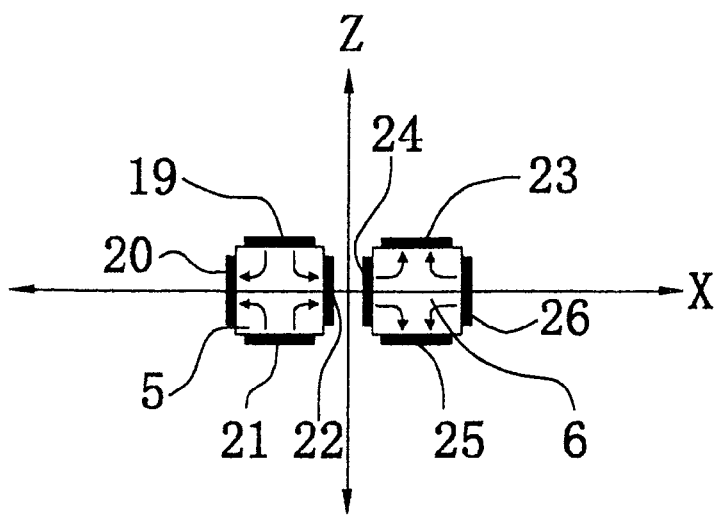
FIG. 4 is a bottom view of the H-type piezoelectric depicted in FIG. 2, showing an arrangement of electrodes thereon.

FIG. 3 is a top view of the piezoelectric vibrator 1 depicted in FIG. 2 and FIG. 4 is a bottom view of the piezoelectric vibrator 1 depicted FIG. 2.

As shown in FIG. 3, the first drive arm 3 has drive electrodes 11, 12, 13 and 14 that are provided over external surfaces that extend parallel to the x-axis. Each of the drive electrodes 11, 12, 13 and 14 extends in the direction of the length of the first drive arm 3, with the drive electrodes 11 and 12 being on opposite sides of the first drive arm 3 from each other and the drive electrodes 13 and 14 being opposite each other in a similar manner. By applying voltages whose polarities are opposite each other to the drive electrodes 11 and 12 and similarly to the drive electrodes 13 and 14, respectively, the first drive arm 3 vibrates within a plane (fx mode).

Further, the second drive arm 4 has, in a manner similar to the first drive arm 3, drive electrodes 15, 16, 17 and 18 over external surfaces that extending parallel with the x-axis. Each of the drive electrodes 15, 16, 17 and 18 extends in the direction of the length of the second drive arm 4, with the drive electrodes 15 and 16 on opposite sides of the second drive arm 4 from each other and the drive electrodes 17 and 18 being opposite each other in a similar manner. By applying voltages whose polarities are opposite to each other to the drive electrodes 15 and 16 and to the drive electrodes 17 and 18, respectively, the second drive arm 4 also vibrates within the plane (fx mode).

As shown in FIG. 4, the first detecting arm 5 has detecting electrodes 19, 20, 21 and 22 on the four surfaces about the y-axis, respectively. Each of the detecting electrodes 19, 20, 21 and 22 extends in the direction of the length of the first detecting arm 5. When the first detecting arm 5 vibrates in a direction perpendicular to the plane (fz mode), the detecting electrodes 19, 20, 21 and 22 generate a current between the respective detecting electrodes that are provided on surfaces orthogonal to each other.

The second detecting arm 6 has, similarly to the first detecting arm 5, detecting electrodes 23, 24, 25 and 26 on the four surfaces around the y-axis, respectively. Each of the detecting electrodes 23, 24, 25 and 26 extends in the direction of the length of the second detecting arm 6. When the second detecting arm 6 vibrates in the direction perpendicular to the plane (fz mode), the detecting electrodes 23, 24, 25 and 26 generate a current between the detecting electrodes that are provided on surfaces orthogonal to each other.

As shown in FIG. 2, a wiring pattern provided on the base 2 connecting the drive electrode 12 to the drive electrode 18 and connecting the drive electrode 14 to the drive electrode 16. Although not shown in FIG. 2, a similar wiring pattern is provided on an opposite side thereof connecting the drive electrode 11 to the drive electrode 17, and connecting the drive electrode 13 to the drive electrode 15. As a result of this arrangement, the first drive arm 3 and the second drive arm 4 vibrate in synchronism with each other based on a drive signal applied to the respective drive electrodes.

Further, as shown in FIG. 2, the wiring pattern provided on the base 2 connects the detecting electrode 21 to the detecting electrode 26, the detecting electrode 22 to the detecting electrode 25, and although not shown in FIG. 2, the detecting electrode 19 is connected to the detecting electrode 24, and the detecting electrode 20 is connected to the detecting electrode 23.

Figure 5:
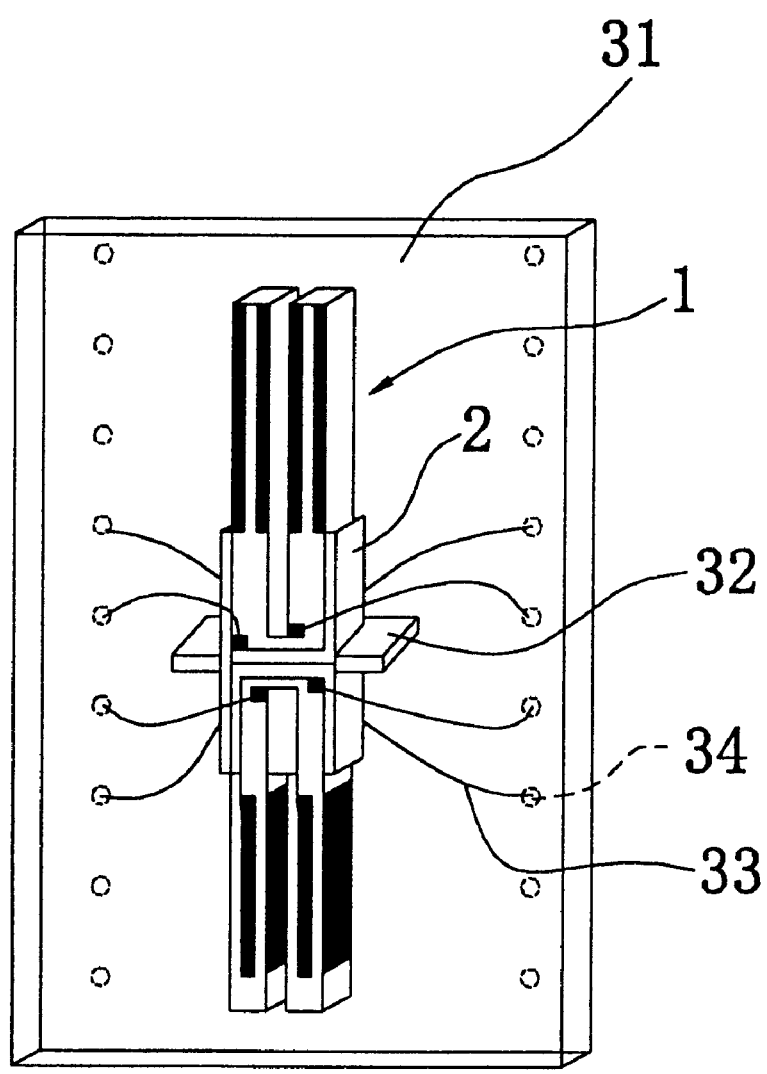
FIG. 5 is a perspective view showing one configuration of mounting of the piezoelectric vibrator.

The thus constructed piezoelectric vibrator 1 is sealed within a sealing case 31 such as shown in FIG. 5. The piezoelectric vibrator 1 is fixed within the sealing case 31 with the base 2 supported by a supporting member 32 that is fixed to the sealing case 31.

Lead electrodes are formed in the wiring pattern provided on the base 2 so that the lead electrodes are connected to the drive electrodes 11 through 18 and the detecting electrodes 19 through 26. The lead electrodes connect the electrodes 11 through 18 and 19 through 26 to corresponding terminal 34 via respective copper wires 33.

In a preferred embodiment, each part of the piezoelectric vibrator 1 has the following dimensions. The length of the base 2 is 11 mm; the length of each of the drive arms 3 and 4 is 7 mm; the length of each of the detecting arms 5 and 6 is 7 mm; the length of a single side of each of the arms 3, 4, 5 and 6 is 1 mm and the width in the x-axis direction is 2.55 mm. Further, the sealing case 31 is of 20 mm×33 mm×4.8 mm.

Figure 6A:
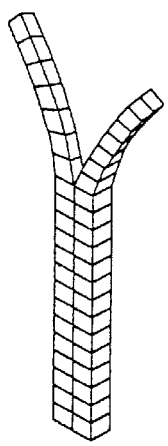
FIGS. 6A, 6B and 6C are diagrams showing various modes of vibration of the H-type piezoelectric depicted in FIG. 2.
Figure 6B:
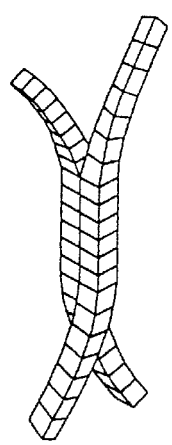
Figure 6C:
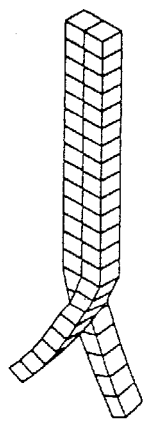

In the thus constructed piezoelectric vibrator 1, there are three different characteristic vibrations such as shown in FIG. 6 in a frequency range to be used. The three different characteristic vibrations are: an fx mode on the drive side as shown in FIG. 6A, in which the first and second drive arms 3 and 4 on the side of the drive electrodes 11 through 18 vibrate within a plane; an fz mode as shown in FIG. 6B, in which both the drive arms 3 and 4 and the detecting arms 5 and 6 vibrate perpendicular to the plane defined by the fx mode vibrations; and an fx mode on the detection side as shown in FIG. 6C, in which the first and second detecting arms 5 and 6 on the side of the detecting electrodes 19 through 26 vibrate within the plane defined by the fx mode. These vibration modes have been verified by the inventors using analyses based on a finite-element method, impedance characteristic measurement results, and front-end displacement measurement results made by an optical displacement transducer. Further, the Q factor in the fx-mode vibrations in this case was 20000, and the Q factor in the fz-mode vibrations was 6000.

Figure 7:
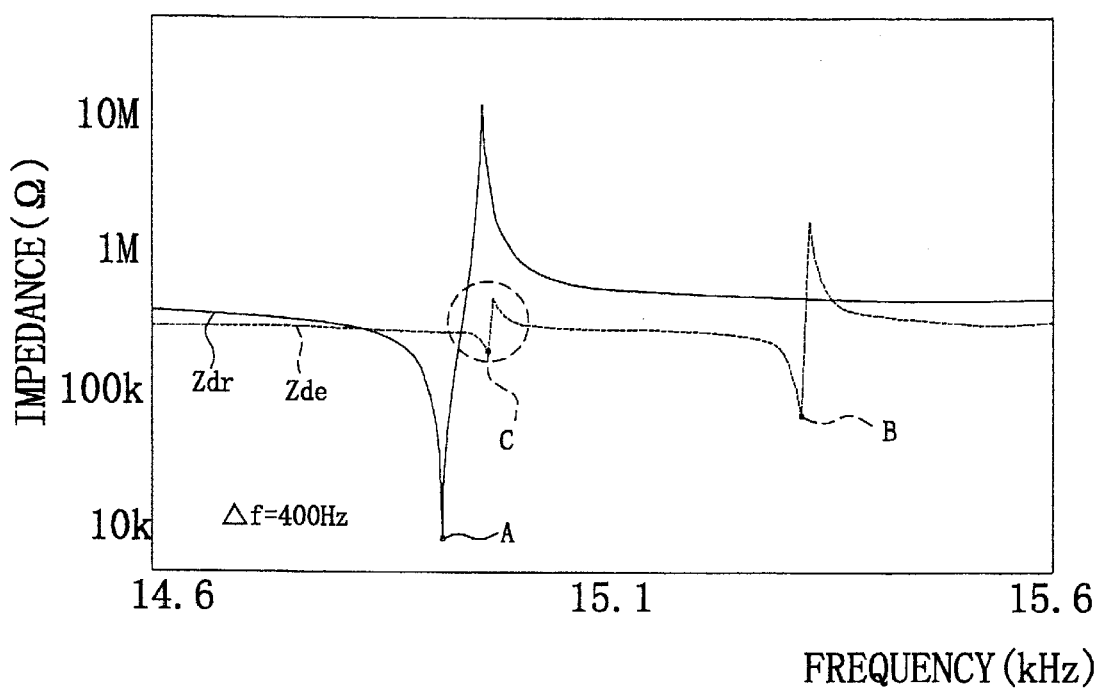
FIG. 7 is a diagram showing frequency characteristics of input impedances of the respective electrodes.

FIG. 7 shows the input impedances of the drive electrodes and detecting electrodes of the thus constructed piezoelectric vibrator 1.

The impedance characteristic Zdr of the drive electrodes 11 through 18 exhibited a minimum peak at point A. This means that a single resonance characteristic is observed on the drive side corresponding to the drive-side fx mode shown in FIG. 6A. In contrast to this, the impedance characteristic Zde of the detecting electrodes 19 through 26 exhibited a minimum peak at point B and a second peak at point C in FIG. 7. This means that a resonance point corresponding to the fz mode shown in FIG. 6B and a resonance point corresponding to the detection-side fx mode are observed on the detection side.

Figure 8:
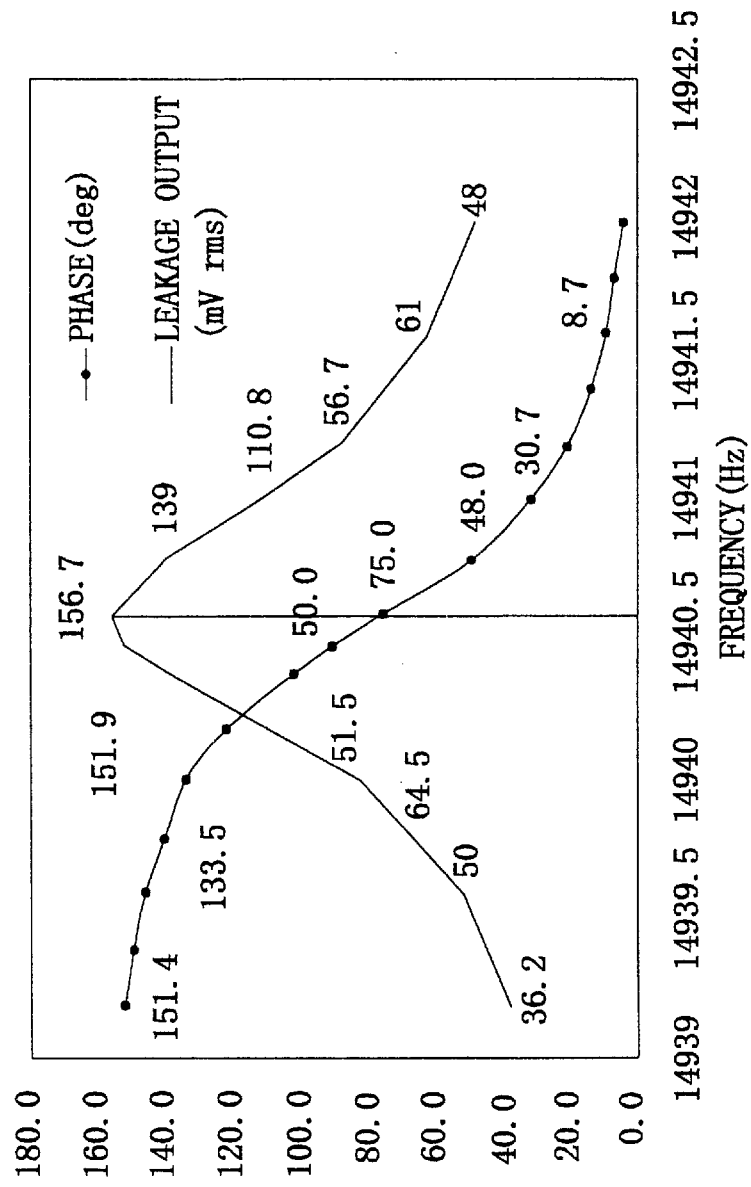
FIG. 8 is a diagram showing frequency characteristics of an amplitude and phase of a leakage output.

Further, FIG. 8 shows a frequency characteristic of a leakage output between the drive electrodes 11 through 18 and the detecting electrodes 19 through 26. As shown in FIG. 8, the leakage output from the drive side to the detection side exhibits characteristics wherein the leakage output maximizes at a detection-side resonant frequency and that its phase changes drastically. Therefore, by detecting the leakage output on the detection side and feeding the detected leakage output back to the drive side to be driven, detection sensitivity can be maintained at a high level even if the drive-side resonant frequency is out of phase with the detection-side resonant frequency, and hence a high detection sensitivity can be maintained even if the detection-side resonant frequency changes with changing temperature.

Figure 9:
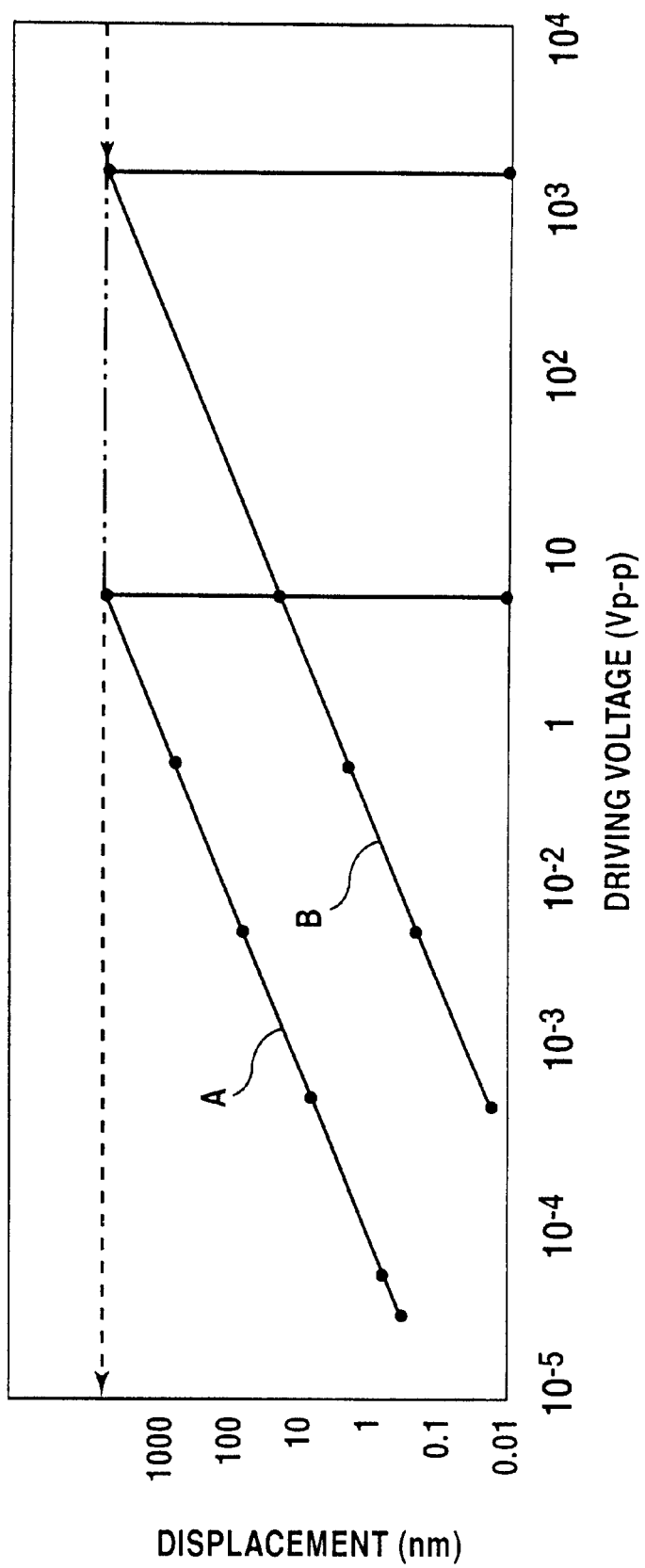
FIG. 9 is a characteristic diagram showing a relationship between drive voltage and displacement of the H-type piezoelectric.

Vibrational displacement measurements were made on the drive arms 3 and 4 as the arms were driven to vibrate at a drive-side resonant frequency and a detection-side resonant frequency that was 400 Hz out of phase with the drive-side resonant frequency. FIG. 9 shows the results. In FIG. 9, the line A indicates a case where the arms were driven at the drive-side resonant frequency, and the line B indicates a case where the arms were driven at the detection-side resonant frequency. The results indicate that the driving of the arms at the detection-side resonant frequency required a voltage 350 times that required by the driving of the arms at the drive-side resonant frequency in order to obtain an equivalent vibrational displacement. This means that a voltage 350 times that applicable to the drive electrodes can be applied to the detecting electrodes, assuming that breakdown limit is proportional to displacement.

Figure 10:
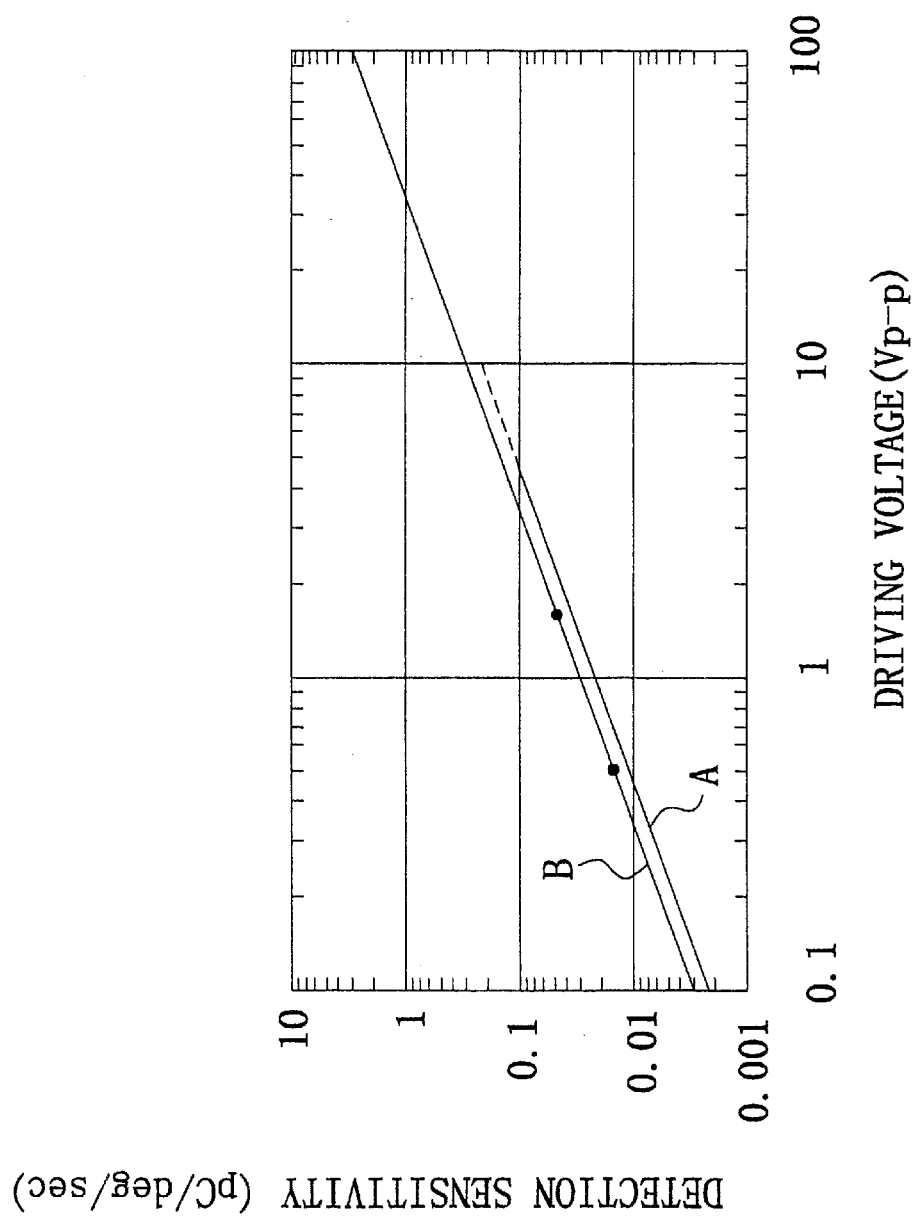
FIG. 10 is a characteristic diagram showing a relationship between drive voltage and detection sensitivity.

FIG. 10 shows a relationship between drive voltage and detection sensitivity observed when the arms were driven to vibrate by a drive-side resonant frequency and a detection-side resonant frequency. In FIG. 10, the line A indicates a case where the arms were driven at the drive-side resonant frequency, and the line B indicates a case where the arms were driven at the detection-side resonant frequency. In either case, a high sensitivity was obtained. Such result could be explained by the fact that a high Q factor in the fx mode, when utilized in both driving and detection, similarly contributes to obtaining a high sensitivity. Further, from the fact that the direction of driven vibration is set to the fx mode and that the Q factor in the fx mode is high, it can be said that a drive voltage reaching the breakdown limit is decreased. In this case, breakage may occur even at a drive voltage as small as about 5 Vrms. In this regard, by driving the piezoelectric vibrator 1 at that resonant frequency which makes the fx mode correspond to the detection side, the drive voltage can be increased as much as 350 times, making it possible to raise the sensitivity substantially. During the experiments, an increase in sensitivity was about 10 times when a voltage of 50 V was applied.

Figure 11:
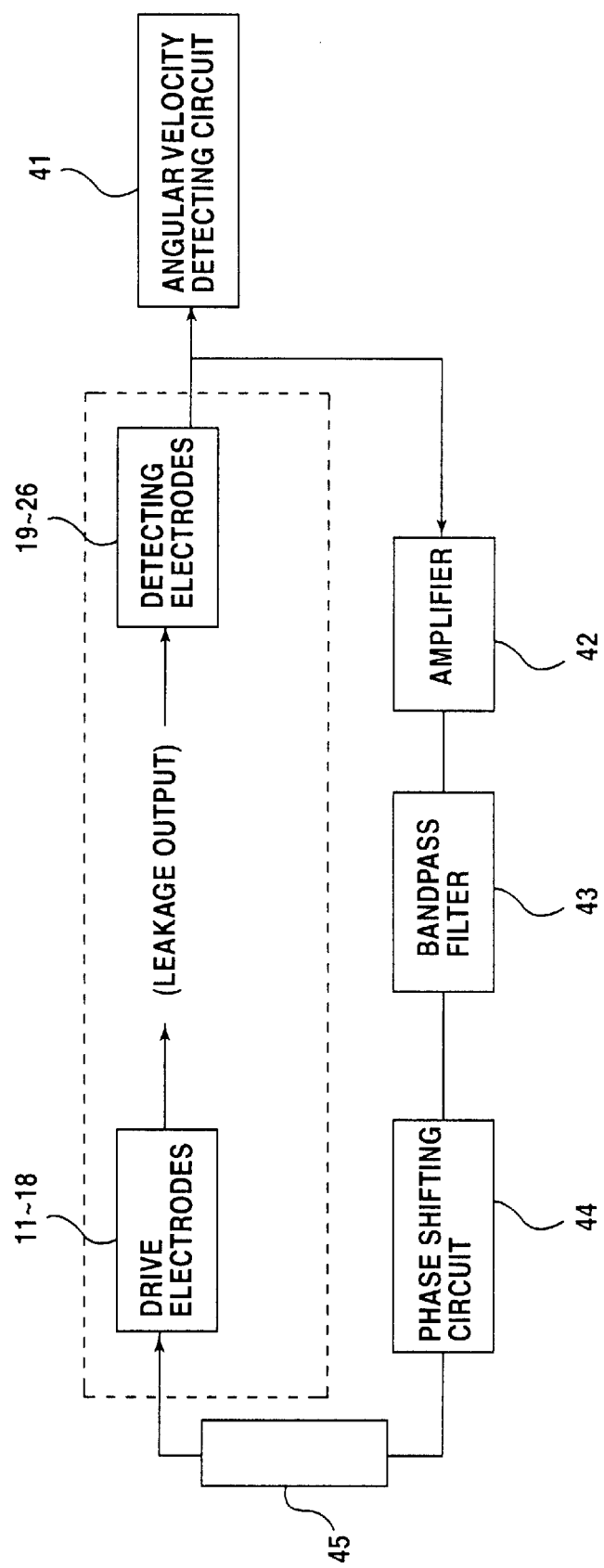
FIG. 11 is a block diagram showing a configuration of a self-excited oscillation circuit used in accordance with a second embodiment of the present invention.

A drive circuit for the above described piezoelectric gyro is shown in FIG. 11.

An output signal from the detecting electrodes 19 through 26 of the piezoelectric vibrator 1 is inputted to an angular velocity detection circuit 41. The angular velocity detection circuit 41 detects fz-mode vibrations at the output of the piezoelectric vibrator 1 in accordance with the output signal of the vibrator 1 and detects the strength of a Coriolis force.

The output signal from the detecting electrodes 19 through 26 is also inputted to an amplifier 42. The amplifier 42 amplifies the output signal from the detecting electrodes 19 through 26 to saturate it, and outputs a constant-voltage signal independently of angular velocity-based amplitude fluctuations. The output of the amplifier 42 is inputted to a bandpass filter 43. The bandpass filter 43 is adjusted to a value so as to allow passage of a frequency band close to the detection-side resonant frequency, and cuts the drive-side resonant frequency component and other noise components. The output of the bandpass filter 43 is inputted to a phase-shifting circuit 44. The phase-shifting circuit 44 converts the signal outputted from the bandpass filter 43 into a drive signal in which the phase is shifted. The output of the phase-shifting circuit 44 is inputted to the drive electrodes 11 through 18 through a limiting resistor 45. The limiting resistor 45 converts the drive signal to be inputted to the drive electrodes 11 through 18 into a constant current. Thus, the piezoelectric vibrator 1, the amplifier 42, the bandpass filter 43, the phase-shifting circuit 44 and the limiting resistor 45 constitute a constant-current self-excited oscillation circuit at the detection side resonant frequency. Alternatively, the bandpass filter 43 can be omitted.

The thus constructed piezoelectric gyro drives the arms to vibrate at the detection-side resonant frequency, so that the detection sensitivity can be maintained at a high level and a high detection sensitivity can be maintained even if the detection-side resonant frequency fluctuates with fluctuating temperature.

Figure 12:
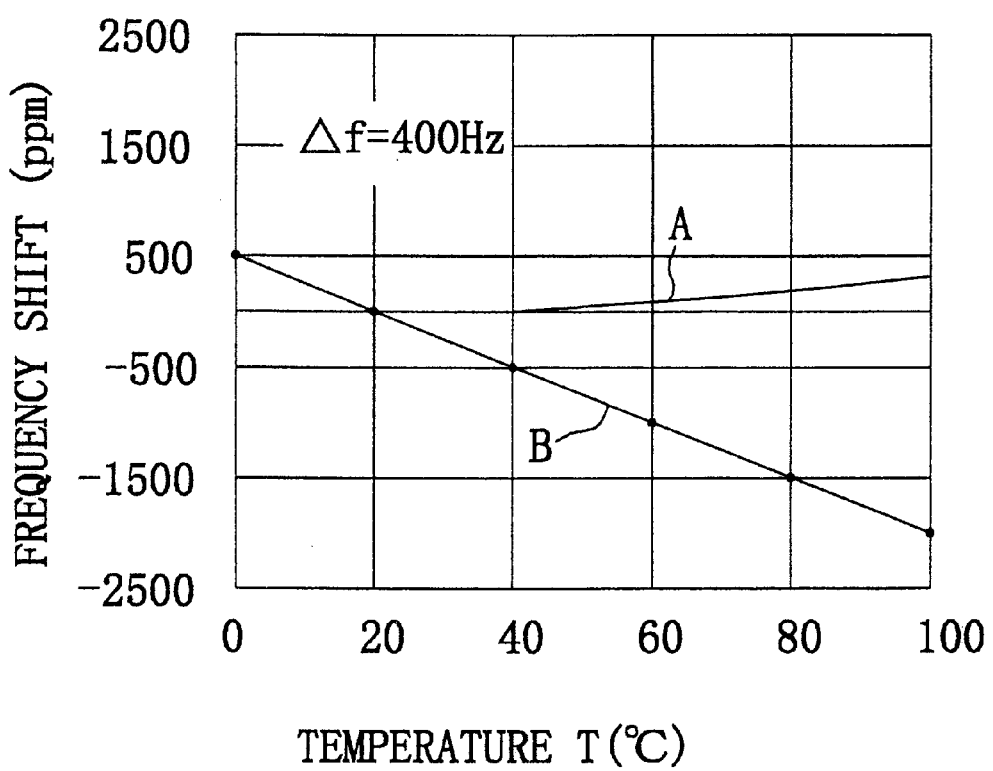
FIG. 12 is a diagram showing changes in the resonant frequencies of the H-type piezoelectric in response to changes in temperature.

For example, the piezoelectric vibrator 1 in this embodiment, which is made of a tantalic acid lithium single crystal, exhibits such temperature characteristics with respect to resonant frequencies as shown in FIG. 12.

As shown in FIG. 12, it is verified that the temperature characteristic A with respect to a resonant frequency that causes the arms to vibrate within a plane exhibits a substantially constant value in a normal environment, while the temperature characteristic B, with respect to a resonant frequency causes the arms to vibrate in a direction perpendicular to the plane exhibits large fluctuations due to temperature fluctuations.

Therefore, as described above, if the arms are driven to vibrate using the detection-side resonant frequency, a high detection sensitivity can be maintained even with temperature fluctuations.

Figure 13A:
FIGS. 13A, 13B, 13C, 13D and 13E are diagrams showing a signal where the signal is pulse-modulated.
Figure 13B:

To detect a very small angular velocity, a drive signal inputted to the drive electrodes 11 through 18 can be pulse-modulated at low frequencies. For example, a drive signal is prepared by using a detection-side resonant frequency such as shown in FIG. 13A as a carrier. In this case, the frequency of this carrier is around 15 kHz. This carrier is pulse-modulated at a low frequency of about 100 Hz as shown in FIG. 13B. A leakage output detected by the detecting electrodes 19 through 26 appears as a pulse signal that uses the detection-side resonant frequency as a carrier. By feeding the detected signal of the detecting electrodes 19 through 26 back to the drive side through the aforementioned self-excited resonance circuit, the drive-side arms can be driven to vibrate at the detection-side resonant frequency.

Figure 13C:
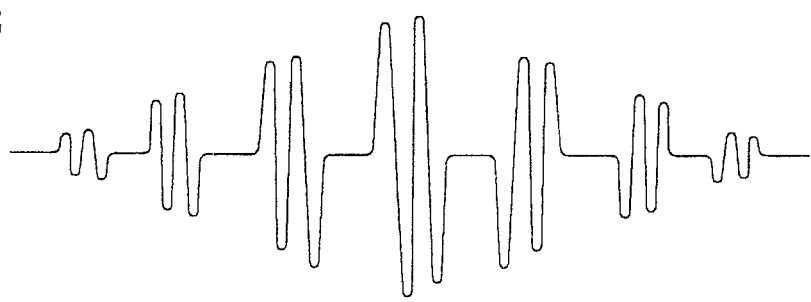
Figure 13D:
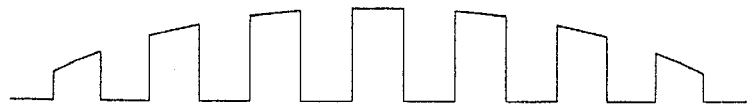
Figure 13E:

When a Coriolis force is applied to the piezoelectric vibrator 1 with the addition of an angular velocity, a signal whose amplitude has been modulated by the Coriolis force appears at the detecting electrodes 19 through 26 as shown in FIG. 13C. When this amplitude-modulated signal is demodulated via a low-pass filter, a pulse signal such as shown in FIG. 13D is obtained. By subjecting this pulse signal to synchronous detection using a carrier, and further to pulse integration, an angular velocity fluctuation based on a low-frequency Coriolis force such as shown in FIG. 13E can be detected.

In this case also, the detected signal obtained from the detecting electrodes 19 through 26 is directly fed back to the drive side through the self-excited resonance circuit. At this time, the detected signal of the detecting electrodes 19 through 26 are amplitude-modulated by the Coriolis force. However, such detected signal is converted into a signal having a predetermined amplitude by the amplifier 42 and, as a result, a drive signal to be inputted to the drive electrodes 11 through 18 is prepared.

The above arrangement is applicable to a case where a very small angular velocity is to be detected, the angular velocity being so small as to provide a sufficient time for subjecting to pulse integration with respect to a detected signal obtained from the detecting electrodes 19 through 26.

A second embodiment of the present invention is now described below.

The piezoelectric vibrator made of a tantalic acid lithium single crystal used in the first embodiment has the Q factor as high as 20000 in the fx mode of vibration as described above and exhibits a satisfactory temperature stability with respect to the resonant frequency in the fx mode. Therefore, it is feasible to supply a drive signal to the detecting electrodes 19 through 26 of the first embodiment to use the fz-mode vibration as the driven vibration, and to use a signal obtained from the drive electrodes 11 to 18 as a detected signal.

In this case, the self-excited oscillation circuit shown in FIG. 11 is prepared, and the detecting electrodes 19 through 26 are driven to vibrate by a leakage output obtained from the drive electrodes 11 through 18. At this time, the driven vibration is in the fz mode whose Q factor is relatively low, and this means that a higher upper limit is given to the breakdown-limit drive voltage. Therefore, to excite the drive side at the detection-side resonant frequency that is out of phase with the drive-side resonant frequency, a high drive voltage is required to bring about a displacement similar to that brought about by the drive-side resonant frequency, and this embodiment can meet this requirement. In this case, a drive voltage 350 times that required for driving in the fx mode can be applied, and by increasing the drive voltage, the actual sensitivity can be further improved.

Further, the resonant frequency in the fx mode fluctuates less with changing temperature as shown in FIG. 12. This is one reason why the resonant frequency in the fx mode is used as the drive signal, and thus the vibration of the driven arms can be stabilized easily. Further, a detected leakage output fluctuates less with changing temperature, and thus the circuit configuration of the bandpass filter 43 can be made simple as well.

A third embodiment of the present invention is described below with respect to FIGS. 14 and 15.

In the third embodiment, additional leakage output detecting electrodes can additionally be provided on the H-type piezoelectric vibrator described above with respect to the first or second embodiments.

Figure 14:
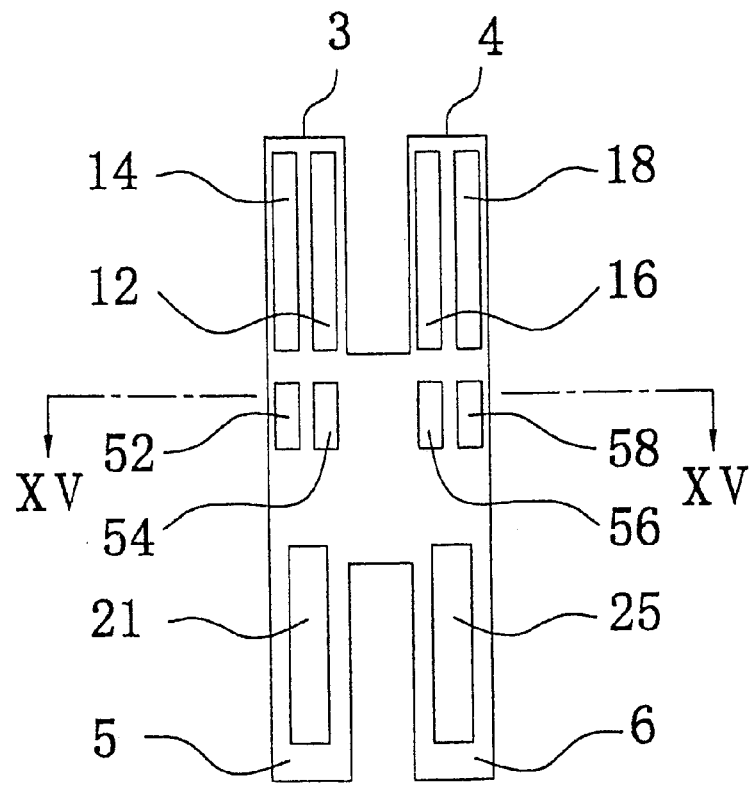
FIG. 14 is a front view of a piezoelectric vibrator in accordance with a third embodiment of the present invention.
Figure 15:
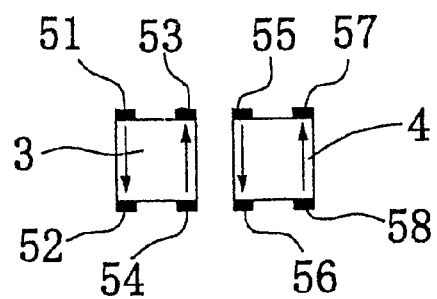
FIG. 15 is a sectional view taken along a line XV—XV in FIG. 14, showing an arrangement of electrodes.

For example, leakage output detecting electrodes 51 through 58 are provided close to the base 2 of the drive electrodes 11 through 18 as shown in FIGS. 14 and 15. The leakage output detecting electrodes 51, 52, 53 and 54 are provided over external surfaces that are parallel with the x-axis of the first drive arm 3. These leakage output detecting electrodes are set to the same polarities as those of the drive electrodes 11, 12, 13 and 14 that are located at the corresponding positions around the y-axis, respectively.

Further, the leakage output detecting electrodes 55, 56, 57 and 58 are provided over external surfaces that extend parallel with the x-axis of the second drive arm 4. These leakage output detecting electrodes are set to the same polarities as those of the drive electrodes 15, 16, 17 and 18 that are located at the corresponding positions around the y-axis, respectively.

In this case, the arms are driven to vibrate in the fz mode by inputting a drive signal to the detecting electrodes 19 through 26 in a manner similar to the second embodiment described above. When a Coriolis force is applied with the addition of an angular velocity, each arm vibrates in the fx-mode. Therefore, the angular velocity can be calculated based on a detected signal obtained from the drive electrodes 11 through 18.

Further, a leakage output from the drive side to the detection side can be obtained by an output signal from the leakage output detecting electrodes 51 through 58. The output signal from the leakage output detecting electrodes 51 through 58 is inputted to the amplifier 42 of FIG. 11, and is fed back to the drive signal to generate a self-excited oscillation.

With this configuration, a signal used for detecting an angular velocity can be processed independently of a leakage output used for driving the arms to vibrate, and thus easy signal processing can be implemented.

The leakage output detecting electrodes corresponding to the detecting electrodes 19 through 26 can also be provided in the first embodiment to detect a leakage output from the drive side to the detection side.

A fourth embodiment of the present invention is described below with respect to FIGS. 16 and 17.

Figure 16:
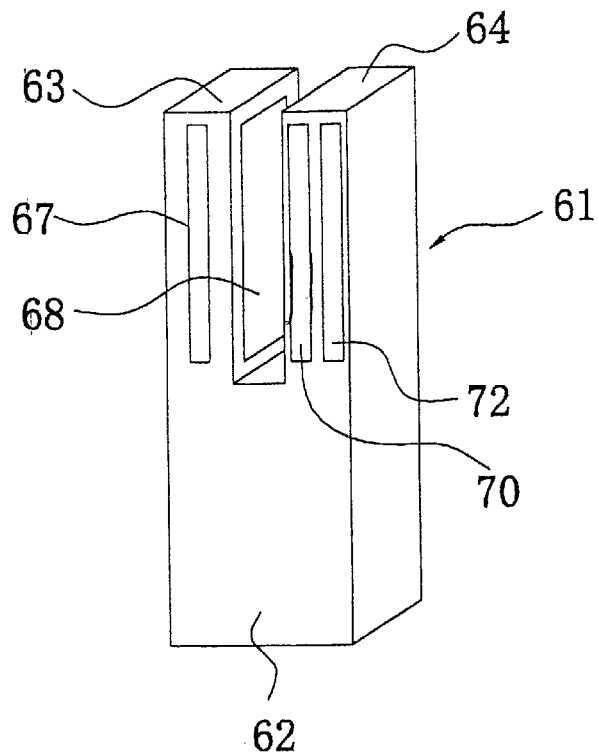
FIG. 16 is a perspective view of a piezoelectric vibrator in accordance with a fourth embodiment of the present invention.
Figure 17:
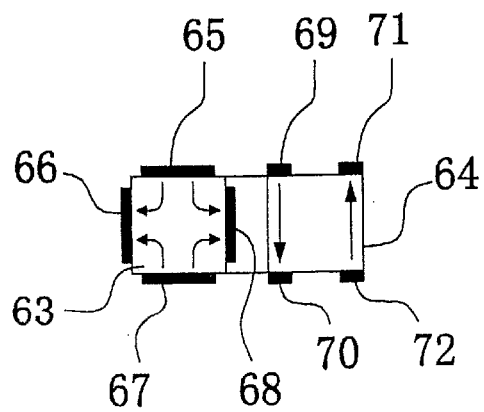
FIG. 17 is a top view showing an arrangement of electrodes on the piezoelectric vibrator depicted in FIG. 16.

The present invention can be applied to a tuning fork-type piezoelectric vibrator 61 such as shown in FIGS. 16 an 17.

The piezoelectric vibrator 61 has a base 62, and a first arm 63 and a second arm 64 that extend in parallel with each other from the base 62. The piezoelectric vibrator 61 is made of a tantalic acid lithium single crystal similar to the aforementioned embodiments.

The first arm 63 has electrodes 65, 66, 67 and 68 on the four surfaces around the y-axis, respectively. Each of the electrodes 65, 66, 67 and 68 extends in the direction of the length of the first arm 63. When the first arm 63 vibrates in a direction perpendicular to a plane, the electrodes 65, 66, 67 and 68 generate a current between these electrodes that are provided on surfaces orthogonal to each other. Further, when a voltage is applied across these electrodes 65, 66, 67 and 68 that are orthogonal to each other, the first arm 63 vibrates in a direction perpendicular to the plane defined by the fx mode (described above).

The second arm 64 has electrodes 69, 70, 71 and 72 on the four surfaces around the y-axis, respectively. Each of the electrodes 69, 70, 71 and 72 extends in the direction of the length of the second arm 64, with the electrodes 69 and 70 being on opposite sides from each other and the electrodes 71 and 72 being on opposite sides from each other. By applying voltages whose polarities are opposite to each other to the electrodes 69 and 70 and to the electrodes 71 and 72, respectively, the second arm 64 is caused to vibrate within the plane (fx mode). Further, when the second arm 64 vibrates within the plane, a current is generated across each pair of confronting electrodes.

When a drive signal is supplied to the electrodes 65 through 68 of the first arm 63 to drive the first arm to vibrate in the fz mode and a detected fx-mode vibration with an angular velocity added is obtained from the electrodes 69 through 72 of the second arm 64, a detected signal from the electrodes 69 through 72 is inputted to the angular velocity detection circuit 41 using the self-excited oscillation circuit described above with respect to FIG. 11, and inputted also to the amplifier 42 to be fed back to the drive side.

In this case, a leakage output from the drive side to the detection side is detected and the detected leakage output can be fed back to the drive side similarly to the aforementioned embodiments, so that the arm can be driven to vibrate at the detection-side resonant frequency, and thus a high detection sensitivity can be maintained. Further, in this case, the fx-mode vibration is used as the detection-side vibration mode. Therefore, the Q factor is high, and thus the detection sensitivity can be maintained at a high level. Hence, the fx-mode resonant frequency that fluctuates less with changing temperature can be utilized.

It may also be designed in such a manner that the second arm 64 is driven to vibrate by supplying a drive signal to the electrodes 69 through 72 on the second arm 64 and that a detected fz-mode vibration is obtained by a detected signal from the electrodes 65 through 68 provided on the first arm 63.

A fifth embodiment is described below with respect to FIGS. 18 and 19.

Leakage output detecting electrodes can also be provided on the base of the fourth embodiment so as to correspond to the detection-side electrodes.

Figure 18:
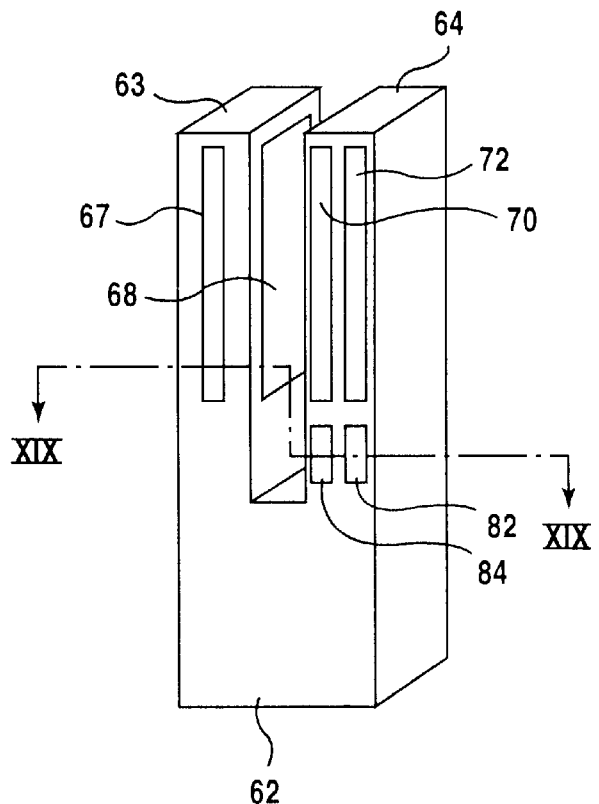
FIG. 18 is a perspective view of a piezoelectric vibrator in accordance with a fifth embodiment of the present invention.
Figure 19:
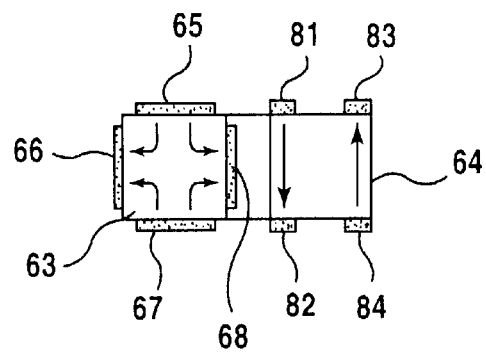
FIG. 19 is a sectional view taken along a line XIX—XIX in FIG. 18, showing an arrangement of electrodes thereon.

For example, leakage output detecting electrodes 81 through 84 are provided close to the base 62 of the drive electrodes 67 through 72 as shown in FIGS. 18 and 19. The leakage output detecting electrodes 81, 82, 83 and 84 are provided over external surfaces that extend in parallel with the x-axis of the second arm 64. These leakage output detecting electrodes are set to the same polarities as those of the drive electrodes 69, 70, 71 and 72 that are located at the corresponding positions around the y-axis, respectively.

In this case, a driven vibration in the fz mode is generated by inputting a drive signal to the detecting electrodes 65 through 68 similar to the fourth embodiment. When a Coriolis force is applied with an angular velocity added, each arm vibrates in the fx-mode. Therefore, the angular velocity can be calculated based on a detected signal obtained from the drive electrodes 69 through 72.

Further, a leakage output from the drive side to the detection side can be obtained by an output signal from the leakage output detecting electrodes 81 through 84. The output signal from the leakage output detecting electrodes 81 through 84 is inputted to the amplifier 42 of FIG. 11, and is fed back to the drive signal to generate a self-excited oscillation.

With this configuration, a signal for detecting an angular velocity can be processed independently of a leakage output for driving the arms to vibrate, and thus easy signal processing can be implemented.

If it is so designed that a drive signal is supplied to the electrodes 69 through 72 provided on the second arm 64 to drive the arm to vibrate in the fx mode and that a detected fz-mode vibration is obtained by a detected signal from the electrodes 65 through 68 provided on the first arm 63, then leakage output detecting electrodes should be provided so as to correspond to the electrodes 65 through 68 of the first arm 63.

Further, a piezoelectric vibrator such as those described above, can be made of a piezoelectric material other than a tantalic acid lithium single crystal.

According to the present invention, driven vibrations are obtained by the detection-side resonant frequency, so that a high detection sensitivity can be maintained at all times. That is, even if the resonant frequency fluctuates in accordance with, e.g., a change in temperature, a high detection sensitivity can be maintained.

What is claimed is:

1. A piezoelectric gyro in which a drive vibrational direction and a detection-vibrational direction are orthogonal to each other, comprising means for excitation-driving the gyro in the drive-vibrational direction at the resonant frequency of gyro vibration in the detection-vibrational direction.

2. The piezoelectric gyro as set forth in claim 1, further comprising a self-excited oscillation circuit configured for generating an excitation in the direction of said driven vibration in response to detection of a leakage output in the direction of said detected vibration.

3. The piezoelectric gyro as set forth in claim 2 wherein said piezoelectric body comprises a base and two arms extending from said base parallel to each other, a first of said arms having drive electrodes fixed thereto to which a drive signal is supplied, a second of said arms having detecting electrodes fixed thereto for outputting a detected signal.

4. The piezoelectric gyro as set forth in claim 3, wherein said drive electrodes are configured such that said arms vibrate within a plane when the drive signal is supplied to said drive electrodes, and said detecting electrodes are configured so as to output said detected signal when said arms vibrate perpendicular to said plane.

5. The piezoelectric gyro as set forth in claim 3, wherein said drive electrodes are configured such that said arms vibrate perpendicular to a plane when the drive signal is supplied to said drive electrodes, and said detecting electrodes are arranged so as to output the detected signal in response to vibration of said arms within said plane.

6. The piezoelectric gyro according to claim 2, further comprising a base, two drive arms extending from said base parallel to each other, and two detecting arms extending from the base parallel to each other on a side of said base opposite said drive arms, said drive arms having drive electrodes fixed thereto to which a drive signal is supplied, said detecting arms having detecting electrodes fixed thereto for outputting a detected signal.

7. The piezoelectric gyro as set forth in claim 6, wherein said drive electrodes are configured such that said drive arms vibrate within a plane in response to the drive signal is being supplied to the drive electrodes, and said detecting electrodes are configured so as to output the detected signal in response to said detecting arms vibrating perpendicular to said plane.

8. The piezoelectric gyro as set forth in claim 6, wherein said drive electrodes are configured such that said drive arms vibrate perpendicular to a plane when the drive signal is supplied to said drive electrodes, and said detecting electrodes are configured so as to output the detected signal in response to vibration of said detecting arms within said plane.

9. The piezoelectric gyro as set forth in claim 3, wherein a leakage output in the direction of detected vibration is detected based on the detected signal outputted from said detecting electrodes.

10. The piezoelectric gyro as set forth in claim 6, wherein a leakage output in the direction of detected vibration is detected based on the detected signal outputted from said detecting electrodes.

11. The piezoelectric gyro as in claim 3, further comprising leakage output detecting electrodes mounted to said base for detecting the leakage output in the direction of detected vibration.

12. The piezoelectric gyro as set forth in claim 6, further comprising leakage output detecting electrodes fixed to said base for detecting the leakage output in the direction of detected vibration.

13. The piezoelectric gyro as set forth in claim 3, wherein the drive signal supplied to said drive electrodes is an alternating current.

14. The piezoelectric gyro as in claim 13, wherein the drive signal supplied to said drive electrodes may be one of the following: amplitude-modulated or frequency-modulated, using the resonant frequency in the direction of detected vibration as a carrier.

15. The piezoelectric gyro as set forth in claim 6, wherein the drive signal supplied to said drive electrodes is an alternating current.

16. The piezoelectric gyro as in claim 15, wherein the drive signal supplied to said drive electrodes may be one of the following: amplitude-modulated or frequency-modulated, using the resonant frequency in the direction of detected vibration as a carrier.

17. A piezoelectric gyro comprising:
- a piezoelectric vibrator formed with a base, two drive arms extending from a first end of said base in parallel one another, and two detecting arms extending from a second end of said base in parallel with each other, said base, said two drive arms and said two detecting arms being formed integrally with one another as a single member;
- drive electrodes fixed to external surfaces of said drive arms, said drive electrodes being configured for vibrating said drive arms in a direction perpendicular to a plane when a drive signal is supplied to said drive electrodes;
- detecting electrodes fixed to external surfaces of said detecting arms for outputting a detected signal in response to vibrations in said detecting arms within said plane;
- a constant-current circuit configured to supply to said drive electrodes the drive signal for driving said drive arms to vibrate; and
- a self-excited oscillation circuit configured for detection of a leakage output in a detected vibration based on the detected signal from said detecting electrodes and processing the drive signal supplied to said drive electrodes from the constant-current circuit at a frequency of the leakage output.

18. A method for driving a piezoelectric gyro in which a direction of driven vibration is orthogonal to a direction of detected vibration, said method comprising the step of:
- generating an excitation in the direction of driven vibration at a resonant frequency in the direction of detected vibration.

19. The method of driving a piezoelectric gyro as set forth in claim 18, wherein the excitation in the direction of driven vibration is generated by detecting a leakage output in the direction of detected vibration and processing the detected leakage output and using the processed detection leakage output with an input into the piezoelectric gyro.

20. The method of driving a piezoelectric gyro as set forth in claim 19, wherein the leakage output is detected based on an output signal of detecting electrodes fixed to a portion of the piezoelectric gyro for detecting the detected vibration.

21. The method of driving a piezoelectric gyro as set forth in claim 19, wherein the leakage output is detected based on an output signal of leakage output detecting electrodes fixed to a portion of the piezoelectric gyro.

22. The method of driving a piezoelectric gyro as set forth in claim 18, wherein a drive signal which generates the driven vibration is prepared from a constant-current circuit.

23. The method of driving a piezoelectric gyro as set forth in claim 14, wherein the driven vibration is generated by a drive signal includes a carrier that is based upon either an amplitude-modulated or frequency-modulated signal using a resonant frequency in the direction of detected vibration.

* * * * *